(12) United States Patent
Payne

(10) Patent No.: US 7,474,816 B2
(45) Date of Patent: *Jan. 6, 2009

(54) WAVEGUIDE WITH A THREE DIMENSIONAL LENS

(75) Inventor: Jonathan N. Payne, San Jose, CA (US)

(73) Assignee: Poa Sana Liquidating Trust, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/734,631

(22) Filed: Apr. 12, 2007

(65) Prior Publication Data

US 2007/0189668 A1 Aug. 16, 2007

Related U.S. Application Data

(62) Division of application No. 10/862,007, filed on Jun. 4, 2004, now Pat. No. 7,267,930.

(51) Int. Cl.
*G02B 6/12* (2006.01)

(52) U.S. Cl. .......................................... 385/14; 385/129

(58) Field of Classification Search ................. 385/14, 385/129

See application file for complete search history.

(56) References Cited

U.S. PATENT DOCUMENTS

| | | | |
|---|---|---|---|
| 3,832,028 A | 8/1974 | Kapron | |
| 4,262,996 A | 4/1981 | Yao | |
| 4,367,916 A | 1/1983 | Mottier et al. | |
| 4,440,468 A | 4/1984 | Auracher et al. | |
| 4,746,770 A | 5/1988 | McAvinney | |
| 4,916,308 A | 4/1990 | Meadows | |
| 5,136,682 A | 8/1992 | Moyer et al. | |
| 5,332,690 A | 7/1994 | Cho et al. | |
| 5,414,413 A | 5/1995 | Tamaru et al. | |
| 5,432,877 A | 7/1995 | Sun et al. | |
| 5,480,764 A | 1/1996 | Gal et al. | |
| 5,540,612 A | 7/1996 | Mendez et al. | |
| 5,604,835 A | 2/1997 | Nakamura et al. | |
| 5,719,973 A | 2/1998 | Monroe et al. | |
| 5,850,498 A | 12/1998 | Shacklette et al. | |

(Continued)

FOREIGN PATENT DOCUMENTS

CN 1260060 A 7/2000

(Continued)

OTHER PUBLICATIONS

Jonathan N. Payne, "Hybrid Waveguide," U.S. Appl. No. 10/758,759, filed Jan. 15, 2004, 26 pages.

(Continued)

*Primary Examiner*—Jennifer Doan
(74) *Attorney, Agent, or Firm*—Beyer Law Group LLP

(57) ABSTRACT

Optical transmission structures include a waveguide and an optical lens wherein the optical lens has a sufficiently large thickness to allow the formation of a curved front lens surface that collimates transmitted light rays so that they travel within a plane that is coplanar to a working surface. The present invention also relates to a technique for manufacturing the optical transmission structure, which involves the use of a photopolymer material. The optical transmission structure can be implemented in various systems such as a system for optical data input.

18 Claims, 5 Drawing Sheets

U.S. PATENT DOCUMENTS

| | | | |
|---|---|---|---|
| 5,914,709 | A | 6/1999 | Graham et al. |
| 6,181,842 | B1 | 1/2001 | Francis et al. |
| 6,341,189 | B1 | 1/2002 | Deacon |
| 6,351,260 | B1 | 2/2002 | Graham et al. |
| 6,456,766 | B1 | 9/2002 | Shaw et al. |
| 6,470,130 | B1 | 10/2002 | Walker et al. |
| 6,491,443 | B1 | 12/2002 | Serizawa et al. |
| 6,538,644 | B1 | 3/2003 | Muraoka |
| 6,555,288 | B1 | 4/2003 | Xu et al. |
| 6,810,160 | B2 * | 10/2004 | Sugama et al. ............... 385/14 |
| 7,099,553 | B1 | 8/2006 | Graham et al. |
| 2002/0030668 | A1 | 3/2002 | Hoshino et al. |
| 2002/0118907 | A1 | 8/2002 | Sugama et al. |
| 2003/0035632 | A1 | 2/2003 | Glebov et al. |
| 2003/0174943 | A1 | 9/2003 | Caracci et al. |
| 2003/0203315 | A1 | 10/2003 | Farahi et al. |
| 2003/0231851 | A1 | 12/2003 | Rantala et al. |
| 2004/0017974 | A1 | 1/2004 | Balch et al. |
| 2004/0076382 | A1 | 4/2004 | Saia et al. |
| 2004/0247236 | A1 * | 12/2004 | Yoshimura et al. ............ 385/16 |
| 2005/0201681 | A1 * | 9/2005 | Payne ........................ 385/33 |
| 2005/0271983 | A1 | 12/2005 | Payne et al. |
| 2006/0001653 | A1 | 1/2006 | Smits |
| 2006/0002655 | A1 | 1/2006 | Smits |
| 2006/0088244 | A1 | 4/2006 | Kukulj et al. |
| 2006/0188196 | A1 | 8/2006 | Charters et al. |

FOREIGN PATENT DOCUMENTS

| | | |
|---|---|---|
| EP | 0569181 | 11/1993 |
| EP | 1271211 | 1/2003 |
| JP | 63-303308 | 12/1988 |
| JP | 20078349 | 3/2000 |
| JP | 2003177264 | 6/2003 |
| JP | 2004-125899 A * | 4/2004 |
| WO | WO02/095668 | 11/2002 |
| WO | WO03/025644 | 3/2003 |
| WO | WO03/071323 | 8/2003 |
| WO | WO2004/011974 | 2/2004 |

OTHER PUBLICATIONS

Xiao Bing Luo, "Waveguide with a Three-Dimensional Lens," U.S. Appl. No. 10/862,003, filed Jun. 4, 2004, 31 pages.

Graham, David S., "Apparatus and Method for a Molded Waveguide for Use with Touch Screen Displays," U.S. Appl. No. 10/861,251, filed Jun. 4, 2004, 25 pages.

Graham, David S., "Apparatus and Method for a Data Input Device Using a Light Lamina Screen and an Optical Position Digitizer," U.S. Appl. No. 10/817,564, filed Apr. 1, 2004, 22 pages.

International Search Report and Written Opinion for PCT Application PCT/US04/10297, mailed on Sep. 13, 2004.

Office Action in 10/758,759, mailed Aug. 25, 2005.

International Search Report and Written Opinion for corresponding PCT application PCT/US2005?019556, mailed on Aug. 29, 2005.

Chen, R. T. "Polymer-Based Photonic Integrated Circuits", Optics and Laser Technology, Elsevier Science Publishers BV, Amsterdam, NL, vol. 25, No. 6, Dec. 1, 1993, pp. 347-365.

International Search Report and Written Opinion for corresponding PCT application PCT/US2005/019560, mailed on Mar. 22, 2006.

International Search Report for corresponding PCT application PCT/US2005/019480, mailed on Nov. 22, 2005.

Office Action in U.S. Appl. No. 10/862,003, mailed Dec. 14, 2007.

Notice of Allowance in U.S. Appl. No. 11/542,816, mailed Dec. 11, 2007.

Allowed Claims from U.S. Appl. No. 11/542,816.

Office Action in U.S. Appl. No. 10/817,564, mailed Sep. 21, 2007.

Office Action in U.S. Appl. No. 10/861,251, mailed Jan. 16, 2008.

Office Action in U.S. Appl. No. 10/758,759 mailed Jan. 25, 2008.

Office Action from Chinese Application 200580024970.4, mailed Nov. 30, 2007.

Office Action from Chinese Application 200580024976.1, mailed Nov. 30, 2007.

International Search Report from PCT/US07/80346 mailed on Mar. 4, 2008.

Written Opinion from PCT/US07/80346 mailed Mar. 4, 2008.

Office Action in Chinese patent application No. 2005800263928, mailed Mar. 7, 2008.

Office Action in Chinese Application 200580024970.4, mailed Aug. 15, 2008.

Office Action from Chinese Application 200580024976.1, mailed Aug. 15, 2008.

Office Action in U.S. Appl. No. 10/862,003, mailed Jun. 2, 2008.

Office Action in U.S. Appl. No. 10/817,564, mailed May 28, 2008.

International Search Report in PCT/US2007/017134, mailed May 26, 2008.

Written Opinion in PCT/US2007/017134, mailed May 26, 2008.

Paloczi et al. "Free-standing All-polymer Microring Resonator Optical Filter", Electronics Letters, IEE Stevebage, GB, vol. 39, No. 23, Nov. 13, 2003, pp. 1650-1651.

Notice of Allowance in 10/861,251 mailed Jun. 27, 2008.

Allowed Claims for 10/861,251, Apr. 15, 2008.

* cited by examiner

WAVEGUIDE WITH A THREE DIMENSIONAL LENS

CROSS-REFERENCE TO RELATED APPLICATIONS

This application is a divisional of U.S. patent application Ser. No. 10/862,007, filed Jun. 4, 2004, now U.S. Pat. No. 7,267,930 and entitled "Techniques for Manufacturing a Waveguide with a Three-Dimensional Lens."

This application is also related to U.S. patent application Ser. No. 10/862,003, filed on Jun. 4, 2004 and entitled "Waveguide With a Three-Dimensional Lens," the content of which is hereby incorporated by reference.

This application is also related to U.S. patent application Ser. No. 10/861,251, filed on Jun. 4, 2004, entitled "Apparatus and Method for a Molded Waveguide for Use with Touch Screen Displays," and to U.S. patent application Ser. No. 10/758,759, filed on Jan. 15, 2004, entitled "Hybrid Waveguide," and to U.S. patent application Ser. No. 10/817,564, filed on Apr. 1, 2004, entitled "A Data Input Device Using A Light Lamina Screen and an Optical Position Digitizer," which claims priority from U.S. Provisional Patent Application No. 60/461,045, filed on Apr. 8, 2003, the contents of each of which are hereby incorporated by reference.

FIELD OF THE INVENTION

The present invention relates generally to optical transmission devices, and more specifically to techniques for manufacturing optical transmission devices.

BACKGROUND

User input devices for data processing systems can take many forms. Two types of relevance are touch screens and pen-based screens. With either a touch screen or a pen-based screen, a user may input data by touching the display screen with either a finger or an input device such as a stylus or pen.

One conventional approach to providing a touch or pen-based input system is to overlay a resistive or capacitive film over the display screen. This approach has a number of problems. Foremost, the film causes the display to appear dim and obscures viewing of the underlying display. To compensate, the intensity of the display screen is often increased.

However, in the case of most portable devices, such as cell phones, personal digital assistants, and laptop computers, high intensity screens are usually not provided. If they were available, the added intensity would require additional power, reducing the life of the battery of the device before recharge. The films are also easily damaged. In addition, the cost of the film scales dramatically with the size of the screen. With large screens, the cost is therefore typically prohibitive.

Another approach to providing touch or pen-based input systems is to use an array of source Light Emitting Diodes (LEDs) along two adjacent X-Y sides of an input display and a reciprocal array of corresponding photodiodes along the opposite two adjacent X-Y sides of the input display. Each LED generates a light beam directed to the reciprocal photodiode. When the user touches the display, with either a finger or pen, the interruptions in the light beams are detected by the corresponding X and Y photodiodes on the opposite side of the display. The data input is thus determined by calculating the coordinates of the interruption of the light beams as detected by the X and Y photodiodes. This type of data input display, however, also has a number of problems. A large number of LEDs and photodiodes are required for a typical data input display. The position of the LEDs and the reciprocal photodiodes also need to be aligned. The relatively large number of LEDs and photodiodes, and the need for precise alignment, make such displays complex, expensive, and difficult to manufacture.

In view of the foregoing, there are continuing efforts to provide improved data entry apparatus and methods having a continuous sheet or "lamina" of light provided in the free space adjacent a touch screen and to an optical position digitizer that detects data entries by determining the location of "shadows" in the lamina caused by an input device, such as a finger or a stylus, interrupting the lamina when contacting the screen.

BRIEF SUMMARY OF THE INVENTION

The present invention is directed to optical transmission techniques for the efficient transmission of light rays within a desired plane that is above a working surface. The techniques specifically relate to an optical transmission structure that includes a waveguide and an optical lens. The optical lens is formed on the working surface and has a sufficiently large thickness to allow the formation of a curved front lens surface that collimates transmitted light rays so that they travel within a plane that is coplanar to the working surface. The present invention also relates to a technique for manufacturing the optical transmission structure, which involves the use of a photopolymer material. The optical transmission structure can be implemented in various systems such as a system for optical data input.

As a method, one embodiment of the present invention includes at least applying a layer of photopolymer material onto a support substrate, providing a patterned grayscale mask that allows a certain pattern of light to pass through the mask at varying intensities, exposing the layer of photopolymer material to light that is directed through the grayscale mask such that selected portions of the photopolymer material are exposed to varying intensities of light, developing the layer of photopolymer material with a developer solution to remove portions of the layer of photopolymer material such that the remaining portion of the photopolymer material forms a waveguide that is integrated with an optical lens, and rinsing the layer of photopolymer material to wash away the removed portions of the photopolymer material. In an alternative embodiment, the method also includes forming the optical lens such that the optical lens has an in-plane collimating lens curve that has an outline that is substantially defined within at least a plane that is perpendicular to a top surface of the support substrate, wherein light rays transmitted from the waveguide are collimated by the optical lens so that the light rays are emitted through the in-plane collimating lens curve in a plane that is substantially coplanar to the top surface of the support substrate. In another alternative embodiment of the method, the invention further includes forming the optical lens such that the optical lens has a directionally collimating lens curve that has an outline that is substantially defined within at least a plane that is coplanar with the top surface of the support surface, wherein the light rays transmitted from the waveguide are collimated such that substantially all of the light rays emitted through the directionally collimating lens curve are parallel to each other and travel in a single direction.

In another embodiment of the invention, the method includes at least applying a layer of photopolymer material onto a support substrate, exposing the layer of photopolymer material to light that is directed through a patterned grayscale mask that allows a pattern of light to pass through the mask at varying intensities such that selected portions of the photopolymer material are exposed, developing the layer of photopolymer material with a developer solution to remove portions of the layer of photopolymer material such that the remaining portion of the photopolymer material forms a waveguide that is integrated with an optical lens wherein the optical lens has a height that is larger than a height of the waveguide and the optical lens has an inclined and curved front lens surface, and rinsing the layer of photopolymer material to wash away the removed portions of the photopolymer material.

In another embodiment of the invention, the method includes at least applying a layer of photopolymer material onto a support substrate, exposing the layer of photopolymer material to light that is directed through a patterned grayscale mask that allows a certain pattern of light to pass through the mask at varying intensities such that selected portions of the photopolymer material are exposed to varying intensities of light, developing the layer of photopolymer material with a developer solution to remove portions of the layer of photopolymer material such that the remaining portion of the photopolymer material forms a waveguide that is integrated with an optical lens, wherein the optical lens has a front lens surface having a curvature that is defined within three dimensions, wherein light rays transmitted from the waveguide are collimated by the optical lens so that the light rays are emitted through the front lens surface in a plane that is substantially coplanar to a top surface of the support substrate, and rinsing the layer of photopolymer material to wash away the removed portions of the photopolymer material.

Another aspect of the invention is a system for manufacturing an optical structure that includes at least a support substrate having a top surface, a layer of photopolymer material this applied to the top surface of the support substrate, a light source that emits light, and a patterned grayscale mask having a grayscale pattern that allows a desired pattern of light from the light source to shine onto the layer of photopolymer material, the grayscale pattern also allowing light to pass through the grayscale mask at different intensity levels, wherein a waveguide with an integrated optical lens can be formed in the photopolymer material layer through a photolithography process.

These and other features and advantages of the present invention will be presented in more detail in the following specification of the invention and the accompanying figures, which illustrate by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known operations have not been described in detail so not to unnecessarily obscure the present invention.

The present invention pertains to optical transmission techniques for the efficient transmission of light rays within a desired plane that is above a working surface. The techniques specifically relate to an optical transmission structure that includes a waveguide and an optical lens. The optical lens is formed on the working surface and has a sufficiently large thickness to allow the formation of a curved front lens surface that collimates transmitted light rays so that they travel within a plane that is coplanar to the working surface. The optical lens shape efficiently collimates the light rays without the need for additional collimating lenses and the manufacturing processes necessary to incorporate such additional lenses. The present invention also relates to a technique for manufacturing the optical transmission structure, which involves the use of a photopolymer material. The optical transmission structure can be implemented in various systems such as a system for optical data input.

The present description will first describe an optical data input system that can utilize an optical transmission structure of the present invention. Then the description will go into detail regarding the optical transmission structure and a method for making the optical transmission structure. It is noted that the optical transmission structure of the present invention can be used to transmit and/or receive light signals even though the term "transmission" might lead one to think that the structure can only be used for transmitting signals. Therefore, the term "transmission" does not functionally limit the optical structure to the transmitting of signals.

Figure 1:
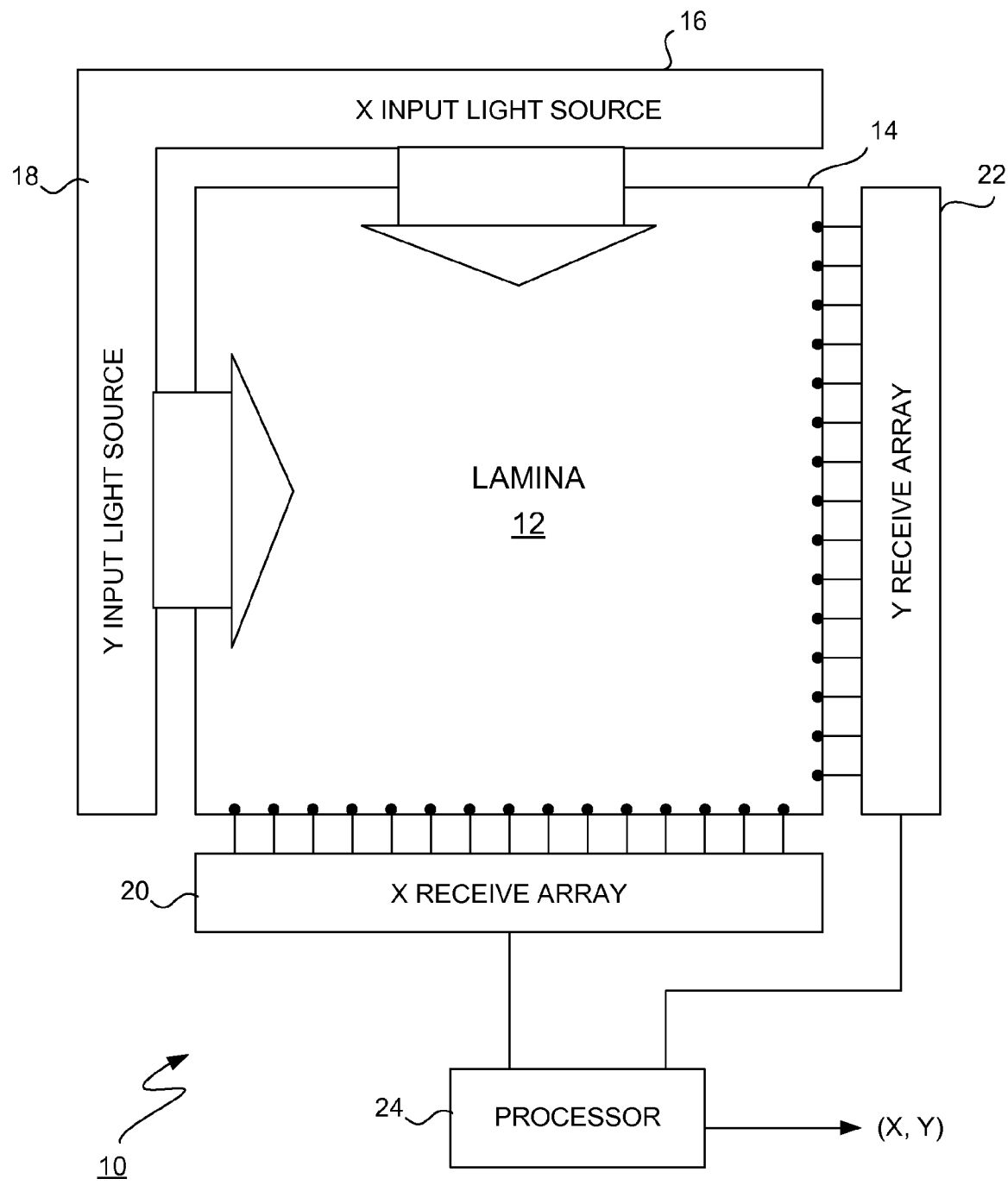
FIG. 1 illustrates a touch screen display system according to one embodiment of the present invention.

Referring to FIG. 1, a touch screen display system according to one embodiment of the present invention is shown. The touch screen display system 10 includes a continuous plane or "lamina" 12 of light generated in the free space adjacent to or just above a display screen 14. The lamina 12 is generated by an X-axis input light source 16 and a Y-axis input light source 18, each configured to propagate light across the free space immediately above the surface of the screen 14 in the X and Y directions respectively. The free space is generally parallel to the surface of the screen 14 and is positioned just in front of the screen 14. The lamina 12 is thus interrupted when an input device (not shown), such as a user's finger or a hand-held stylus or pen, is used to touch the screen 14 during a data entry operation. An X-axis light receiving array 20 and a Y-axis light-receiving array 22 are positioned on the two opposing sides of the screen 14 opposite the X-axis and Y-axis light sources 16 and 18 respectively. The light receiving arrays 20 and 22 detect the X-axis and Y-axis coordinates of any interrupt or "shadow" in the lamina 12, caused by an input device breaking the lamina 12 in the free space above the screen 14 during a data entry operation. A processor 24, coupled to the X-axis and Y-axis arrays 20 and 22, is used to calculate the X-axis and Y-axis coordinates of the interrupt. Together, the X and Y-axis arrays 20 and 22 and the processor 24 provide an optical position detection device for detecting the position of interrupts in the lamina 12. Based on the coordinates of the interrupt, a data entry on the screen 14 can be determined.

The light lamina 12 is substantially of uniform intensity according to one embodiment of the invention. The required dynamic range of the photosensitive circuitry in the receiving X-axis and Y-axis arrays 20 and 22 is therefore minimized and high interpolation accuracy is maintained. In an alternative embodiment, however, a non-uniform lamina 12 may be used. In this circumstance, the lowest intensity area of the lamina 12 should be higher than the light activation threshold of the light detecting elements used by the X-axis and Y-axis arrays 20 and 22.

The display screen 14 can be any type of data display according to various embodiments of the invention. For example, the screen 14 can be a display for a personal computer, workstation, server, mobile computer, laptop computer, a point of sale terminal, personal digital assistance (PDA), cell phone, any combination thereof, or any type of device that receives and processes data entries.

The X and Y input light sources 16 and 18 are each a source of collimated light beams according to one embodiment of the invention. The collimated light may be generated in any of a number of different ways. For example, from a single light source mounted at the focal point of a collimating lens. Alternatively, the collimated light beams may be generated from a plurality of point light sources and collimated lenses respectively. In yet another embodiment, the X and Y input light sources 16 and 18 can be made from a fluorescent light and a diffuser. The point light source or sources may be a Light Emitting Diode (LED) or a Vertical Cavity Surface Emitting Laser (VCSEL).

In yet another embodiment, the light source may be a light transmitter with spaced facets fed by a vertical laser.

The wavelength of the light generated by the X-axis and Y-axis light sources 16 and 18 used to create the lamina 12 may also vary according to different embodiments of the invention. For example, the light may be of a wide-band having an extended wavelength spectrum range from 350 nanometers to 1100 nanometers, such as white light from an incandescent source. Alternatively, the input light can be of a narrow band having a limited spectrum ranging within 2 nanometers. The use of narrow band light enables the filtering of wide band ambient noise light. The use of narrow band light also enables the substantial matching of the light wavelength to the response profile of the X-axis light-receiving array 20 and the Y-axis light-receiving array 22. In yet another embodiment, a homogeneous, single wavelength light, may be used. For example infrared or IR light, commonly used in wireless or remote data transfer communications, may be used in this application.

The light sources, regardless of the type, may also be operated either continuously or periodically, using on an on/off cycle. An on/off cycle conserves power, minimizes the heat generated by the source light, and permits temporal filtering to reduce noise, such as lock in detection. During the off cycle, the X light receiving array 20 and a Y light receiving array 22 measure the passive or "dark" light (noise). The dark light measurement is then subtracted from the active light detected during the on cycle. The subtraction thus filters out DC background caused by the ambient light. During each off cycle, the passive light may also be calibrated, permitting the system to adjust to changing ambient light patterns.

In yet another embodiment, the X-axis and Y-axis light sources 16 and 18 may be cycled on and off intermittently. During alternate cycles, when the X-axis source 16 is on, the Y-axis source 18 is off, and vice versa. This arrangement requires less peak power since only one light source is on at a time, while still allowing subtraction filtering to occur during each X and Y on/off cycle respectively.

To reduce power consumption, a "sleep" mode may also be used for the X-axis and Y-axis light sources 16 and 18. If no data inputs are made for a predetermined period of time, the intensity of the X-axis and Y-axis light sources 16 and 18 may be dimmed. The rate at which shadow interrupts are sampled is also done at a low rate, for example, approximately 5 times a second. When a shadow interrupt is detected, the intensity of the X-axis and Y-axis light sources 16 and 18 and the sampling rate are all increased to a normal operating mode. If no shadow interrupts are detected after the predetermined period of time, X-axis and Y-axis light sources 16 and 18 are again dimmed and the sampling rate reduced.

The X-axis and Y-axis arrays 20 and 22 each include substrate waveguide arrays and photosensitive elements. The photosensitive elements are configured to convert light signals into electrical signals indicative of the intensity of the received light. Specifically, each substrate has a plurality of waveguides. Each waveguide has a free space end proximate the lamina 12 and an output end proximate to a photosensitive element. The photosensitive elements are either affixed to or positioned adjacent the output end of the waveguides respectively. For a detailed explanation of the use and manufacture of waveguides, see U.S. Pat. No. 5,914,709 by David Graham et al., the inventor of the present application, and incorporated by reference herein for all purposes. The photosensitive elements can be implemented using a number of well-known ways, for example using Charge-Coupled Devices (CCD) or CMOS/photodiode arrays. Either type of imaging element can be implemented in many forms, including on a dedicated integrated circuit such as an application specific integrated circuit, a programmable circuit, or any other type of integrated or discrete circuit containing photosensitive areas or components. Again, additional details on the various types of photosensitive elements that may be used with the present invention are discussed in the aforementioned patent. Regardless of the type of photosensitive elements used, the output electrical signals indicative of the received light intensity along the X and Y coordinates are provided to the processor 24. The processor 24 determines the location of any shadows in the lamina, caused by an interrupt in the lamina 12 during an input operation, based on the electrical signals.

Figure 2:
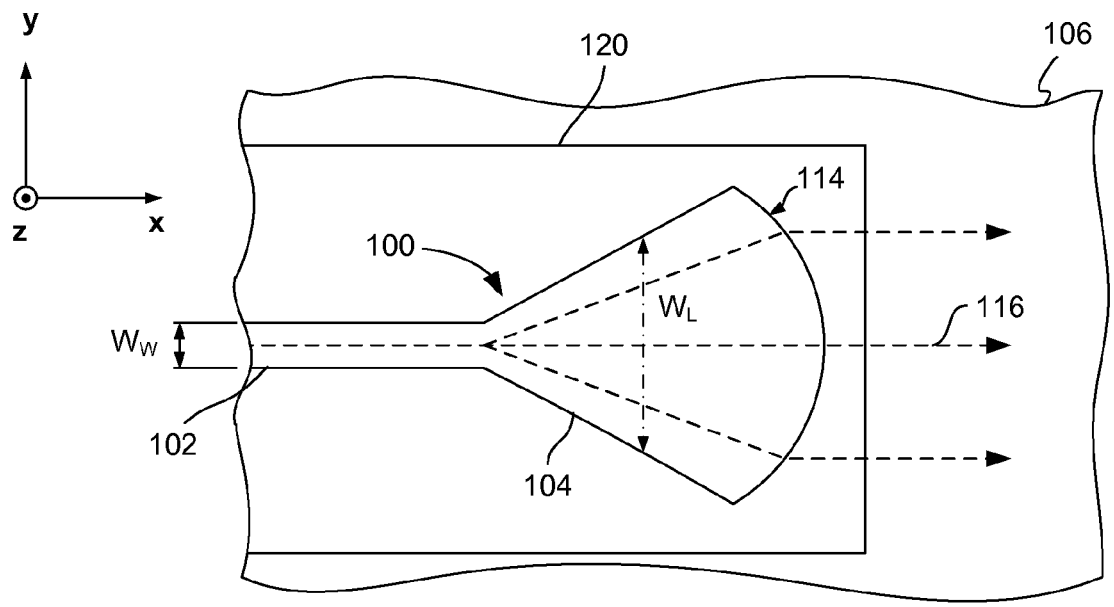
FIGS. 2 and 3 illustrate a top plan and a side plan view, respectively, of an optical transmission structure according to one embodiment of the present invention.
Figure 3:
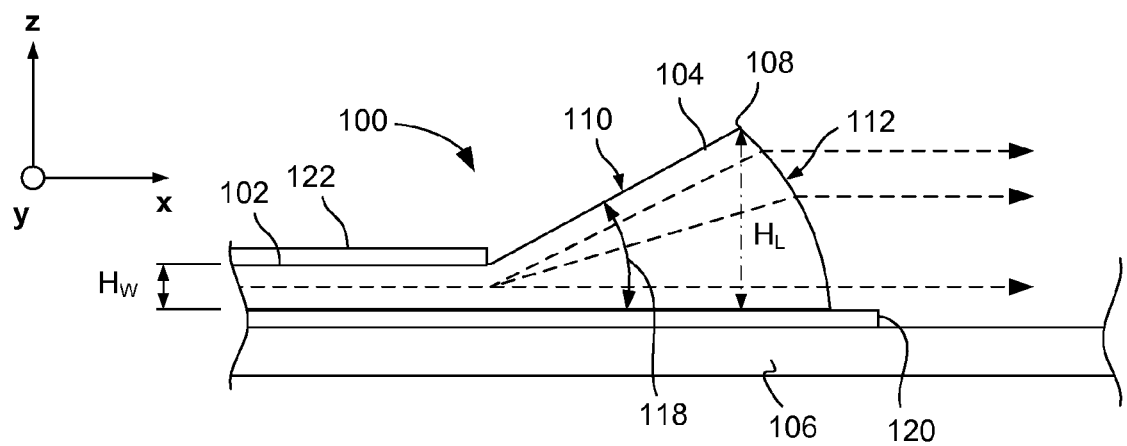

FIGS. 2 and 3 illustrate a top plan and a side plan view, respectively, of an optical transmission structure 100 according to one embodiment of the present invention. Optical transmission structure 100 includes a waveguide 102 and an optical lens 104. Optical transmission structure 100 is formed upon a bottom cladding layer 120, which is formed upon a support structure 106. A top cladding layer 122 covers the top surface of waveguide 102. The dashed directional lines of FIGS. 2 and 3 generally illustrate the path of light rays that pass through optical structure 100. The directional arrows show the light rays as being transmitted out of optical structure 100, however, it should be understood that light rays can also be received into optical structure 100 along substantially the same paths shown by the dashed lines.

Waveguide 102 and optical lens 104 can be formed of any suitable material for conveying light or light signals throughout its medium, such as a polymer based material, optical plastic, and epoxy. Waveguide 102 and optical lens 104 can be integrally formed with each other, formed separately and then attached to each other, or even formed in proximate locations with respect to each other. As shown in FIGS. 2 and 3, waveguide 102 and 104 are integrally formed with each other.

The integrally formed waveguide 102 and optical lens 104 is more easily manufactured since alignment issues between the two components are obviated. Typically waveguide 102 and optical lens 104 are formed of the same material. However, in some embodiments where waveguide 102 and optical lens 104 are formed separately, these two components can be made from different materials.

Top and bottom cladding layer 122 and 120, respectively, serve to improve the optical transmission qualities of waveguide 102. Top and bottom cladding layers 122 and 120 are selected to have indexes of refraction that complement that of waveguide 102. The cladding layers also serve to physically protect waveguide 102, which can be made of a fragile material. Top cladding layer 122 covers waveguide 102 in FIG. 3. However, in alternative embodiments, top cladding layer 122 also covers back surface 110 of optical lens 104. Top cladding layer 122 should not cover the surfaces of optical lens 104 through which light rays travel in and out of. In some embodiments, no top cladding layer is applied to the top surface of waveguide 102. In these embodiments, waveguide 102 is left without physical protection and the ambient air acts as the cladding layer. The index of refraction for air can often be optimal for light transmission purposes. Note that top cladding layer 122 is not shown in FIG. 2 in order to more clearly illustrate the structure of waveguide 102.

Bottom cladding layer 120 extends beneath waveguide 102 and optical lens 104. In some embodiments, bottom cladding layer 120 is not utilized, as support substrate 106 can act as a cladding layer. In these embodiments, support substrate 106 should be properly selected for its index of refraction. Waveguide 102 is an elongated structure for transmitting light between two points. In the present invention, one end of waveguide 102 is connected to an optical lens 104 and the opposite end is connected to a light source or a light-detecting device. The light transmission capacity of waveguide 102 can be adjusted by varying the dimensions of the waveguide 102.

For example, the diameter or width and height of waveguide 102 can be sized appropriately. The height or thickness, $H_w$, waveguide 102 can be seen in FIG. 3 and the width, $W_w$, of waveguide 102 can be seen in FIG. 2. The cross-sectional shape of waveguide 102 can be rectangular or rounded.

Optical lens 104 has a height or thickness, HL that is larger than $H_w$. Optical lens 104 rises in height from its interface with waveguide 102 to the apex 108 of HL of optical lens 104. Back surface 110 defines the shape of optical lens 104 between waveguide 102 and apex 108. In this embodiment, back surface 110 has a substantially flat surface. The height of optical lens 104 allows a front surface of optical lens 104 to have a curvature that is defined in either two or three dimensions. A two-dimensional curvature of optical lens 104 is a curve that has an outline that is defined within a single plane, for example in the X-Y, X-Z, or Y-Z plane. In other words, the curve is defined within two dimensions. A three-dimensional curvature is defined within three dimensions. For example, such a curve would have an outline shape that is defined within each of two planes such as the X-Y and the X-Z planes. As will be described, the optical lens 104 of FIGS. 2 and 3 has a three-dimensional curvature wherein the curvature has an outline shape defined within the X-Y and the X-Z planes.

The front surface of optical lens 104 slopes downward from apex 108 to the front edge of lens 104 that interfaces with support substrate 106. This slope can be seen in the side plan view of optical structure 100 of FIG. 3. FIG. 3 also illustrates the cross-sectional view of optical structure 100 in the X-Z plane. The sloped surface is curved and forms the in-plane collimating lens curve 112. In-plane collimating lens curve 112 is formed throughout the front surface of optical lens 104 and collimates exiting light rays such that they are substantially parallel with the top surface of support substrate 106. The in-plane collimating lens curve 112 directs the light rays across the support substrate rather than allowing some of the light rays to shoot away from support substrate 106.

The outline of the in-plane collimating lens curve 112 is defined within a plane that is perpendicular to the top surface of support substrate 106 and which is aligned with the direction that a particular light ray travels. As such, the in-plane collimating lens curve 112 is visible from the side-plan view of FIG. 3, which also represents the X-Z plane. FIG. 3 shows the in-plane collimating lens curve 112 for light rays that travel along the longitudinal axis 116 of waveguide 102 as seen in the top plan view of FIG. 2. The curvature of the in-plane collimating lens curve 112 depends upon the height of optical lens 104 and the distance of the front surface of optical lens 104 from waveguide 102. The curvature of the in-plane collimating lens curve also depends upon other factors such as the nature of the light rays and the index of refraction of the lens material and the surrounding environment. With respect to data input system 10 of FIG. 1, in-plane collimating lens curve 112 of optical lens 104 allows the input light sources 16 and 18 to more efficiently form a lamina 12 of light because less light loss is experienced. Advantageously, this reduces the power requirements needed to form lamina of light 12. Without the in-plane collimating lens curve 112, light rays from optical structure 100 would diffract and a portion of the light rays would be directed away from support surface 106. To accomplish the same functions of the in-plane collimating lens curve 112, an additional optical lens would need to be positioned in front of optical lens 104. This would be a more complicated optical system to manufacture in terms of time, effort, and resources. For example, the process of aligning the additional lens with optical lens 104 would be time consuming and would be highly subject to alignment errors.

Notice that in-plane collimating lens curve 112 has a curve that forms a portion of a hemispherical arc. Therefore, optical lens 104 can be said to form one-half of a full lens wherein the missing half would be the mirror reflection of optical lens 104 along the x-axis. As will be described below, the shape of optical lens 104 is more easily manufactured than if optical lens 104 had a full lens shape. Also, the "half-lens" shape of optical lens 104 allows for easier integration and alignment with waveguide 102. Specifically, the "half-lens" shape of optical lens 104 makes a photolithographic manufacturing process ideal for manufacturing optical structure 100.

The in-plane collimating lens curve 112 as seen in the side plan view of FIG. 3 is independent from the directionally collimating lens curve, which can be seen from the top plan view of optical lens of FIG. 2. Note that FIG. 2 illustrates a view of optical structure 100 in the X-Y plane. The outline shape of directionally collimating lens curve 114 is defined within a plane that is coplanar with the top surface of support substrate 106. Directionally collimating lens curve 114 collimates the exiting light rays to travel parallel to each other and in a single direction. Essentially, directionally collimating lens curve 114 allows optical lens 104 to create a uniform beam of light. With respect to data input system 10 of FIG. 1, directionally collimating lens curve 114 allows each optical structure 100 to form a uniform beam of light that travels across display screen 14.

Optical lens 104 is shaped to allow light rays to travel between front lens surface 112 and waveguide 102. To allow the maximum amount of light from waveguide 102 to be collimated by front lens surface 112, back surface 110 should have an angle of at least $\sin^{-1}(\sqrt{n_1^2-n_2^2}/n_3)$. Such an angle is referred to as the critical angle 118 of optical lens 104 Note that $n_1$, is the index of refraction of waveguide 102, $n_2$ is the index of refraction of the top cladding layer 120 or bottom cladding layer 122, whichever is larger, and $n_3$ is the index of refraction of optical lens 104. Note that when optical lens 104 and waveguide 102 are formed of the same materials, n1 and n3 will have the same value. Note that the maximum amount of light that can be collimated by front lens surface 112 is inherently limited due to the shape of optical lens 104. Since optical lens 104 has a partial lens shape, wherein a full lens would have a shape that mirrors optical lens 104 along the x-axis, approximately one-half of the light transmitted from waveguide 102 is lost. As such, optical structure 100 has approximately 3 dB light loss. In some embodiments, sacrificing some more light loss, by allowing back surface 110 to have an angle less than the critical angle, to get an optical lens with a smaller HL is suitable. In an alternative embodiment, back surface 110 of optical lens 104 can rise beyond a flat surface defined by the critical angle 118 (see FIGS. 4 and 5). Such an embodiment is also effective since the material above the critical angle 118 does not affect the light rays that travel through the rest of optical lens 104.

As seen from the top plan view of FIG. 2, optical lens 104 has a cone shape where the width, WL of optical lens 104 increases as optical lens 104 extends away from waveguide 102. The cone shape of optical lens 104 allows the light rays from waveguide 102 to expand throughout optical lens 104 until they are collimated into a uniform beam by directional lens curve 114. The cone-like proportions of optical lens 104 depends upon the optical performance requirements of each optical structure 100.

In alternative embodiments, optical lens 104 can have various sizes and shapes. For example, optical lens 104 need not have a cone shape as seen from a top plan view as in FIG. 2. Also, optical lens 104 could have a flat front surface as seen from top plan view of FIG. 2 in situations where the light rays need not be emitted in a uniform beam of light. In one embodiment, optical lens 104 can have a height, HL in the range of 50 to 200 um and a length in the range of approximately 0.8 to 1.2 mm. Sometimes the size of optical lens 104 is constrained by the size of the system within which it is utilized, for example a display screen as shown in FIG. 1. Specific sizes of optical lens 104 are also determined by relative indexes of refraction for the optical structure 100 and the surrounding environment. For example, the type of cladding that surrounds the optical structure 100 is also a determinative of the optical lens 104 dimensions.

Support structure 106 can be any surface across which light rays are meant to be directed across for example, display screen 14 as shown in FIG. 1. Alternatively, support structure 106 can also be a structure that is separate from a display screen. For example, support structure can be a separate mounting surface that supports each optical structure 100 which is then positioned proximate to a working surface such as a display screen. In these other embodiments, support structure can be a layer of plastic, epoxy, or a polymer. Support structure 106 can also be a cladding layer meant to protect waveguide 102 from physical damage and to increase the optical transmission efficiency of the waveguide 102.

In one embodiment, multiple optical structures 100 are formed in a row so that multiple light beams are directed across a working surface, such as a display screen 14 in FIG. 1. At the same time, another row of optical structures 100 are formed to receive each light beam. Two sets of such optical structures can then be formed so that light beams cross display screen 14 along two axes, such as an X and Y-axes.

Figure 4:
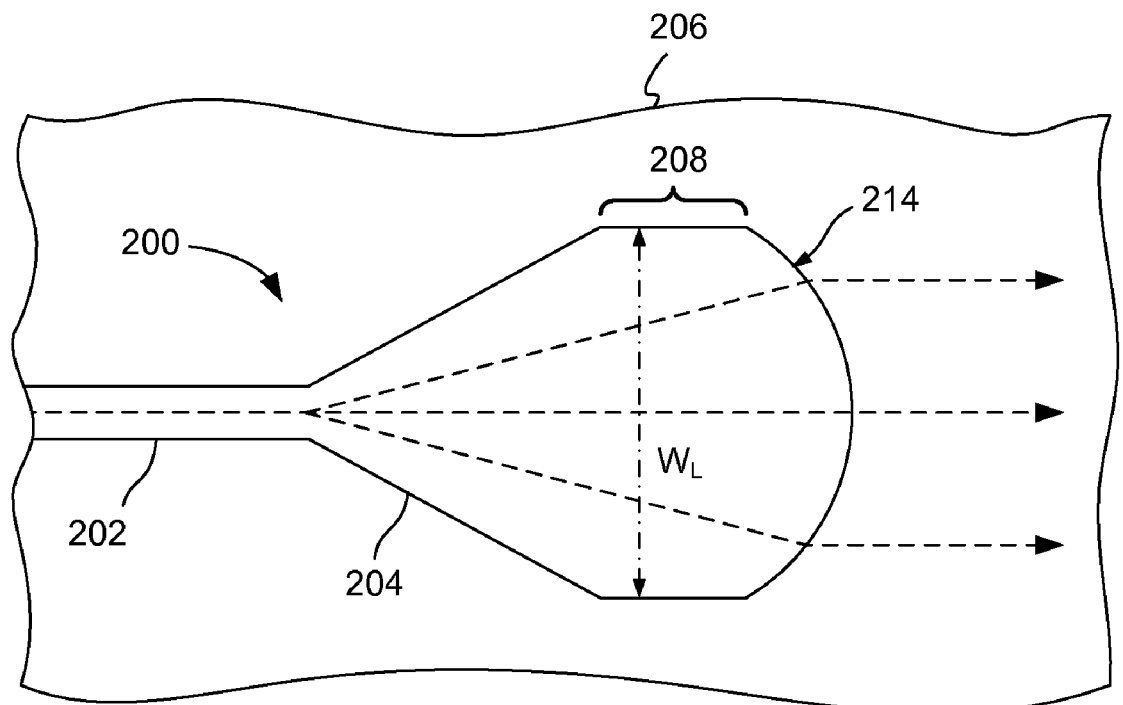
FIGS. 4 and 5 illustrate a top and a side plan view, respectively, of an optical 10 transmission structure according to an alternative embodiment of the present invention.
Figure 5:
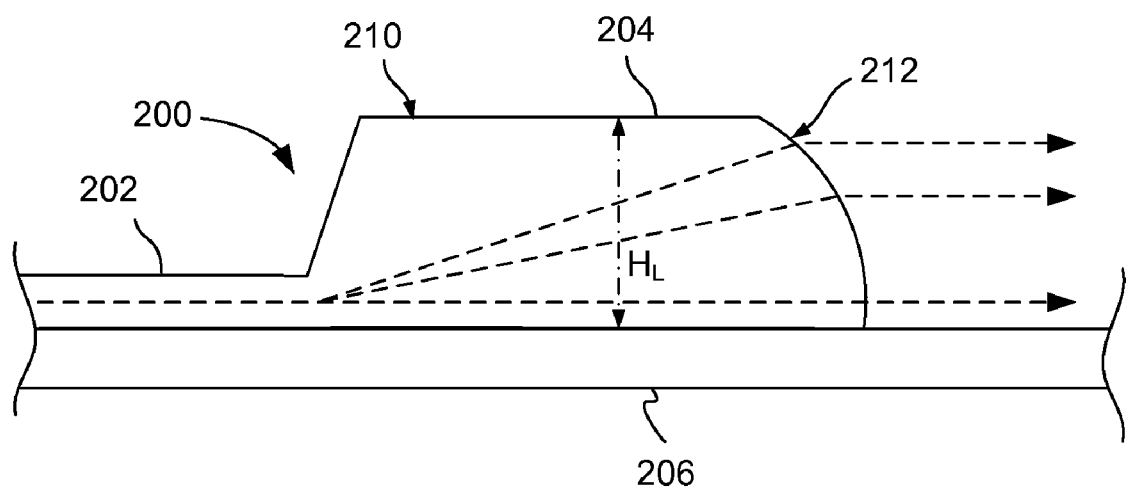

FIGS. 4 and 5 illustrate a top and a side plan view, respectively, of an optical transmission structure 200 according to an alternative embodiment of the present invention. Optical transmission structure 200 includes a waveguide 202 and an optical lens 204. Optical transmission structure 200 is formed upon a support structure 206. The dashed directional lines of FIGS. 2 and 3 generally illustrate the path of light rays that pass through optical structure 100. The directional arrows show the light rays as being transmitted out of optical structure 100, however, it should be understood that light rays can also be received into optical structure 100 along substantially the same paths shown by the dashed lines.

Note that no top cladding layer is applied over the top of waveguide 202 and optical lens 204. Also note that no bottom cladding layer supports optical structure 200. However, support substrate 206 can serve as a bottom cladding layer by selecting the material of support substrate 206 to have an appropriate index of refraction.

As described with respect to FIGS. 2 and 3, optical lens 104 also has an in-plane collimating lens curve 212 that can be seen in FIG. 5 and a. directional lens curve 214 that can be seen in FIG. 4. However, as can be seen in FIG. 5, optical lens 204 has a back surface 210 that extends beyond the critical angle 118 as shown in FIG. 3. Back surface 210 has a height, $H_L$ that is substantially uniform until it quickly drops off to join with waveguide 202. Also, as can be seen from the top plan view of FIG. 4, optical lens 204 has an extended portion 208 having a uniform width, $W_L$. In some situations, the specific dimensions and proportions of optical lens 104 can be easily manufactured and can be more easily integrated with another system.

Figure 6:
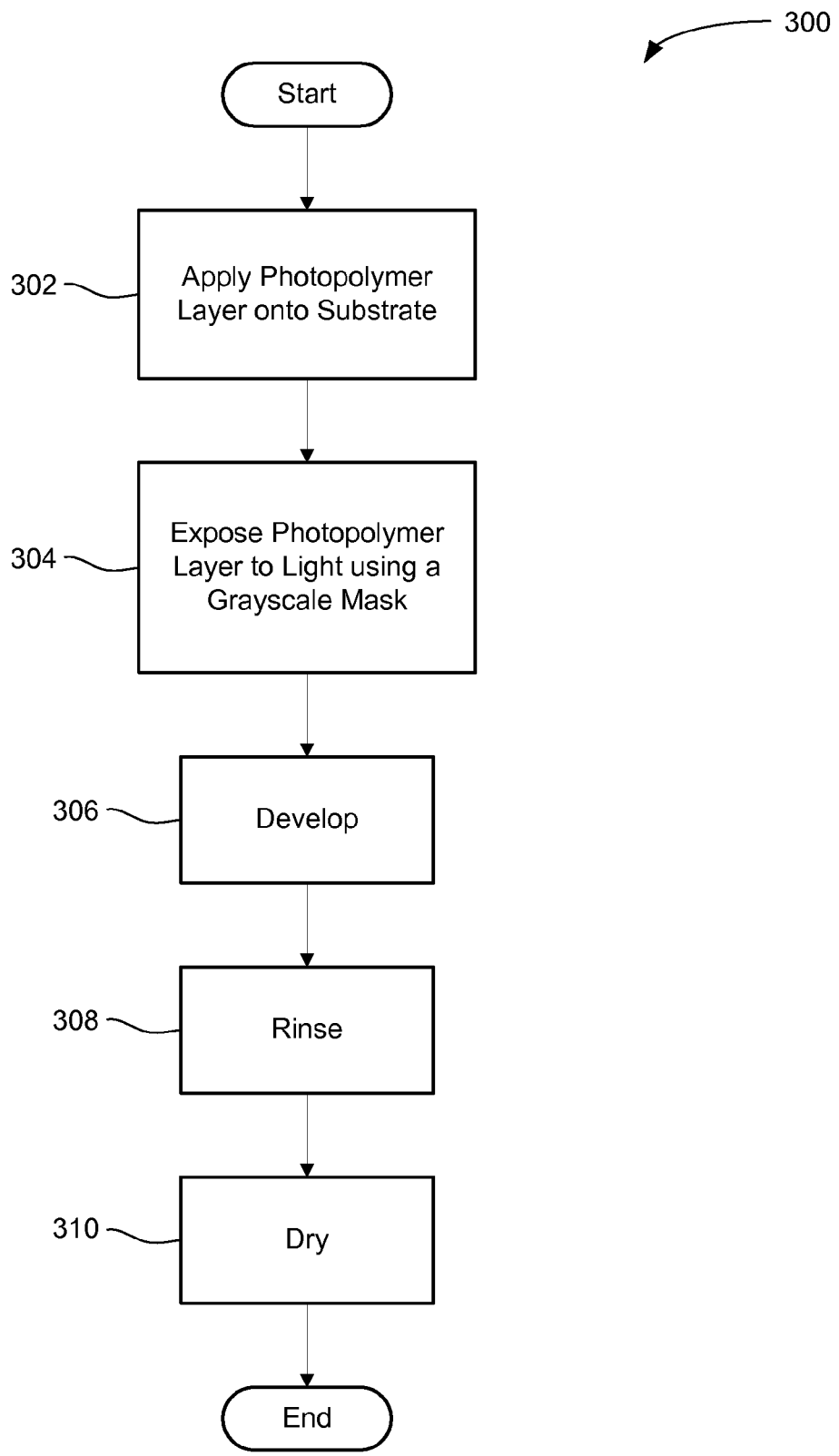
FIG. 6 illustrates a flow diagram that describes a method for manufacturing an optical structure according to one implementation of the invention.
Figure 7:
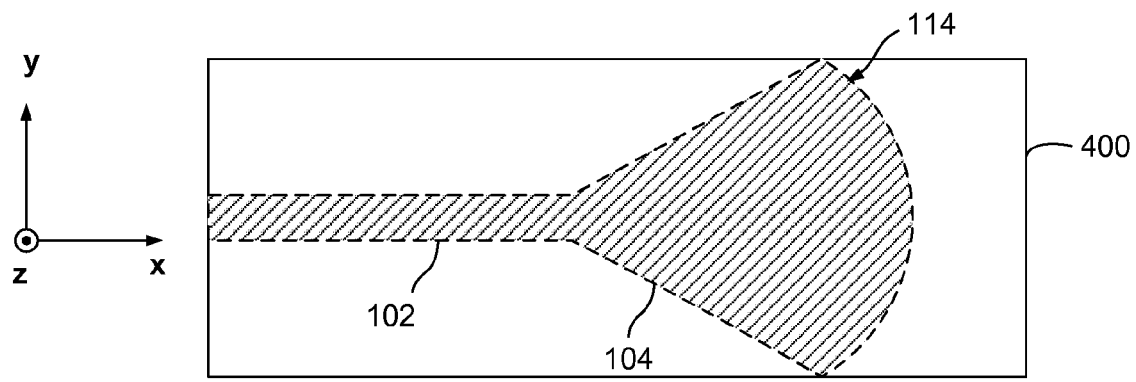
FIGS. 7 and 8 illustrate a top plan and a side plan view, respectively, of a layer of photopolymer material that has been applied to a support substrate wherein the photopolymer 15 material layer will be processed according to one embodiment of the present invention.
Figure 8:
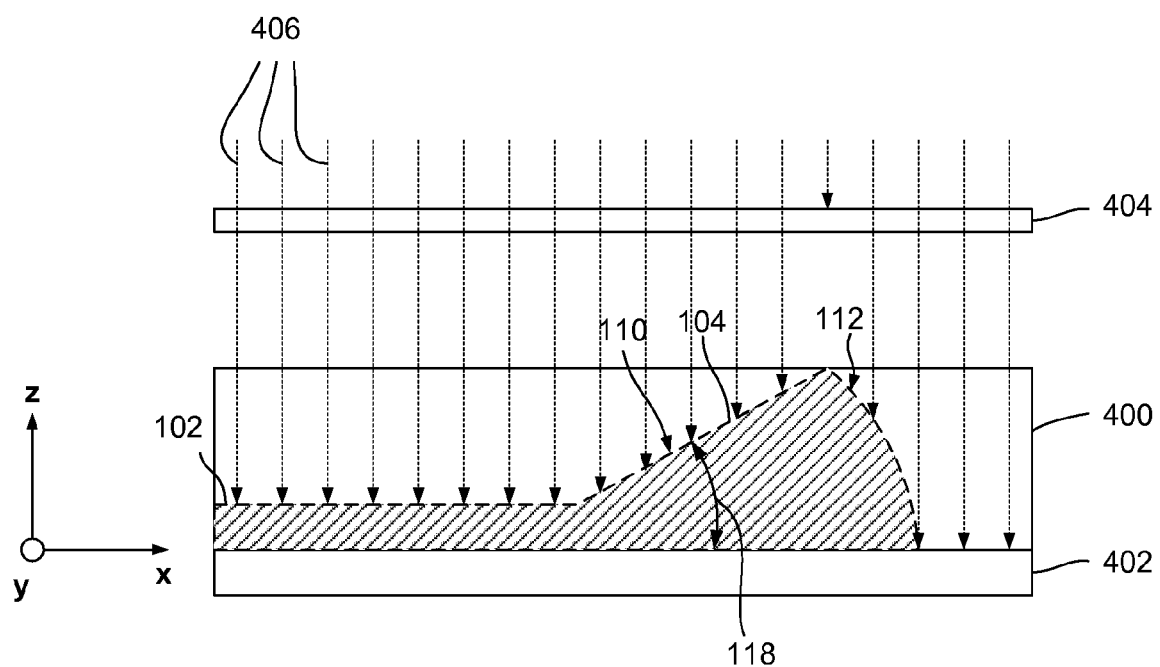

FIG. 6 illustrates a flow diagram 300 that describes a method for manufacturing an optical structure according to one implementation of the invention. In some embodiments, the manufactured optical structure has a lens surface that has a curvature defined in three-dimensions. FIGS. 7 and 8 will also be described along with FIG. 6 in order to more fully illustrate the operations of flow diagram 300. FIGS. 7 and 8 illustrate a top plan and a side plan view of a layer of photopolymer material 400 that has been applied to a support substrate 402 wherein the photopolymer material layer will be processed according to one embodiment of the present invention.

Generally, flow diagram 300 describes manufacturing an optical structure through the use of photopolymers, grayscale masks, and photolithographic techniques. However, it should be understood that there are other techniques for manufacturing the optical structure of the present invention. For example, micromolding techniques can be used to fabricate the lens structures at desired sizes and scales. Also, the lens structure can be fabricated of glass, plastics, ceramics, and other materials using three-dimensional grayscale photoresist structures, three-dimensional resist structures fabricated by "reflow" techniques followed by a "dry" industrial etch process including reactive ion etching, ion milling, and other plasmabased combinations and methods.

Photopolymers are imaging compositions based on polymers, oligomers, or monomers, which can be selectively polymerized and/or cross linked upon exposure to light radiation such as ultra-violet light. Photopolymers are leveraged industrially as patternable systems where light induced chemical reactions in the polymer chemistry result in a differential change in solubility between regions exposed to light and regions not exposed to light (masked). Photopolymers can be made into different forms including film/sheet, liquid, solution etc., which can be used in printing plates, as photoresists, and in stereolithography and imaging. One conventional use of photopolymers is to form printing plates wherein a photopolymer plate is exposed to a pattern of light to create a printing plate. The plate is then used for ink printing. Photopolymers are widely used in the electronics and micro-device industries as photoresists used to create intricate patterns in microscopic circuits on semiconductor chips, printed circuit boards, and other products. Photopolymers are also used as ultraviolet adhesives used to attach optical fibers and for other industrial applications.

Photopolymer materials can be exposed to light that is directed through a patterned mask. Such patterned masks can be grayscale masks. Grayscale masks have a designed pattern that in addition to allowing light to pass through in a desired pattern, allows light to pass through the mask at varying intensities. Grayscale masks can therefore allow a photopolymer layer to be exposed to a pattern of light that has varying light intensities. In this way, portions of a photopolymer layer can be removed depending upon the level of light intensity received. This means that the depth of photopolymer material removal can be controlled. For example, photopolymer material can be removed from an entire section or a portion of photopolymer material can be removed to leave a remaining layer of photopolymer material that has a varying thickness. Photopolymers can therefore be formed into specific structures with predetermined dimensions in three dimensions. In alternative embodiments of the invention, masks that either allow light to completely pass through or completely block light can also be used.

Flow diagram 300 of FIG. 6 starts at block 302 where a layer of photopolymer material 400 is applied onto the top surface of a support substrate 402. Note that the reference numbers mentioned in the description of flow diagram 300 reflect the reference numbers shown in FIGS. 6, 7 and 8. The layer of photopolymer material 400 typically has a relatively uniform thickness. Since some embodiments of the manufacturing process 300 will be used to make the optical structure as seen in FIGS. 2-5, the photopolymer layer 400 should have a thickness that is at least equal to the height, HL of the optical lens. The photopolymer material should be of a quality to that efficiently transmits light. For instance, the photopolymer material can be of a very clear quality. The photopolymer material can be of positive or negative tone for photolithography purposes.

Support substrate 402 has a top surface upon which photopolymer material layer 400 is applied. Support substrate 402 will typically be a substrate that can be mounted within a photolithography system so that the layer of photopolymer material 400 can be processed. Support substrate 402 can be formed of materials such as, but limited to, plastics, polymers, ceramics, semiconductors, metals, and glass. Support substrate 402 can also be a cladding layer meant to surround a waveguide that will be formed from the photopolymer material. Such a cladding layer protects structures formed from the photopolymer layer 400 and its inherent index of refraction facilitates the transmission of light through the photopolymer material. At the end of the manufacturing process, support structure 402 and the structures formed from the photopolymer material layer 400 can be transported and then attached to a device, such as an optical input device 10 as shown in FIG. 1.

In an alternative embodiment, a bottom cladding layer is applied to the support substrate 402, after which photopolymer material layer 400 is then applied on top of the bottom cladding layer. In the embodiment shown and described in FIGS. 6-8, depending upon the material selection, support substrate 402 can serve as the bottom cladding layer. A bottom cladding layer can also be applied to the surface of support substrate 206 through photolithographic techniques.

At block 304, the layer of photopolymer material 400 is exposed to a pattern of light that is created with a patterned grayscale mask 404. This is performed by shining a light source through patterned grayscale mask 404, or by blocking light from passing through this mask. Grayscale mask 404 is patterned to create a waveguide and an optical lens within photopolymer material layer 400. The waveguide and the optical lens can be integrally formed as shown in FIGS. 2-5. Using the same reference numbers from FIGS. 2 and 3, the cross-hatched region in FIGS. 7 and 8 represent the waveguide 102 and the optical lens 104 that will be formed within photopolymer material layer 400. In other words, the cross-hatched area represents the portion of the photopolymer layer 400 that will remain after completing the photolithography process. The top plan view of FIG. 7 shows that grayscale mask 404 allows light to expose the region of photopolymer material layer 400 outside of the waveguide 102 and optical lens 104 and conversely protects the photopolymer material 400 that will form waveguide 102 and optical lens 104 from exposure to light.

Light that shines through grayscale mask 404 is represented by directional and dashed lines 406 in FIG. 8. The grayscale nature of mask 404 allows light to pass through at varying intensities and therefore allows light to penetrate photopolymer material layer 400 to varying depths. The end point for each of lines 406 represents the depths to which each light ray penetrates photopolymer material layer 400. The material composition of photopolymer layer 400 is changed by the light exposure only with respect to the depth of light penetration and resulting chemical changes in photopolymer system produced by this exposure gradient. The light exposure gradient refers to the pattern of light created by the grayscale mask wherein the light rays that pass through the mask have varying intensities. In this way, three-dimensional (or "contoured") structures, such as optical lens 104, can be formed from photopolymer material layer 400. Specifically, a front lens surface having an in-plane collimating lens curve 112 can be formed as seen in the side plan view of FIG. 8. As described above the in-plane collimating lens curve has an outline that is defined within a plane that is perpendicular to the top surface of support structure 106. Also, the front lens surface has a directionally collimating lens curve 114 as seen in the top plan view of FIG. 7. As described above, the directionally collimating lens curve has an outline that is defined within a plane that is coplanar with the top surface of the support structure 106. Also, optical lens 104 has a back surface 110 that is inclined and extends from waveguide 102 to the top of optical lens 104. Grayscale mask 404 can be patterned so that back surface 110 can have any shape so long as it at least rises above the critical angle 118 of $\sin^{-1}(\sqrt{n_1^2 - n_2^2}/n_3)$ wherein n1 is the index of refraction of waveguide 102, n2 is the index of refraction of the support substrate 402, which acts as the bottom cladding layer, and n3 is the index of refraction of optical lens 104.

In alternative implementations of block 304, photopolymer material layer 400 can be exposed to various patterns of light through grayscale mask 404 to form various structures within photopolymer material layer 400. For example, various three-dimensional or two-dimensional structures can be formed. Specifically, optical lens 104 could have a lens surface that has either one of an in-plane collimating or a directionally collimating curve. An optical lens 104 having only a directionally collimating lens curve 114 can have a height that is the same as waveguide 102 such that the optical structure has a flat top surface.

Waveguide 102 can be formed to have a rectangular or a rounded cross-sectional shape. In one embodiment, waveguide 102 can be formed to have a rectangular cross-sectional shape that has a height and width of approximately 8-10 microns each. The lengthwise dimension of waveguide 102 can extend along a straight or curved path in order to connect to a light source or light detector.

The use of photopolymer material layer 400 is advantageous since optical lens 104 and waveguide 102 can be easily formed to be integral with each other. This eliminates any arduous task of aligning a waveguide with an optical lens. The ability to form an optical lens that has an in-plane collimating lens curve 112 also simplifies the manufacturing process of certain optical structures in that a separate lens is not needed to perform the function of the inplane collimating lens curve 112. Such a separate lens would require additional resources for the lens itself and for the positioning and alignment.

Identical optical lens structures can be created in photopolymers using positive-tone masks with negative-tone optical photopolymer, or by using negative-tone masks with positive-tone optical photopolymer. Positive-tone photopolymer material systems and negative-tone photopolymer material systems can be used with gray scale masking techniques to create exposure gradients resulting in three-dimensional polymeric structures following development. Again, structures formed by the photopolymer material form engineered structures such as the waveguides and the optical lenses.

In FIGS. 7 and 8, the portion of photopolymer material layer 400 that is exposed to light can be removed during a subsequent developing process—positive tone. The length of each dashed line 406 of FIG. 8 can represent the energy vectors, or the amount of light energy, of each light ray that shines upon photopolymer material layer 400.

In alternative embodiments where photopolymer material layer is negative tone, the light causes the photopolymer material to cross-link into stronger structures than what are formed with positive-tone photopolymer systems. The unexposed areas of the photopolymer material will be washed away. Wherein the length of each dashed line 406 of FIG. 8 can be viewed as proportional to the light energy of each light ray for a positive tone photopolymer material layer, the inverse amount of energy represented by each dashed line 406 is suitable for a negative tone photopolymer material layer.

In some implementations of the manufacturing process 300, multiple optical structures formed of both a waveguide 102 and an optical lens 104 can be formed. The multiple optical structures can be formed so that an array of light beams are directed out of the optical lenses 104. Such an array of light beams can form a lamina of light 12 as shown in FIG. 1.

In block 306, a developer solution is washed over photopolymer material layer 400 in order to develop the photopolymer material layer 400. The developer solution can be an organic solvent or an aqueous solution. Exemplary developer solutions include but are not limited to Methyl-Iso-Butyl-Ketone(MIBK), Tetra-Methyl-Ammonium-Hydroxide (TMAH), and Potassium Hydroxide (KOH). Dry development using plasma-based processing is also possible. The developer solution removes regions exposed to light at different rates than regions not exposed to light (differential solubility is induced by light induced chemical reactions in photopolymers) resulting in useful patterns following development processing. The portions of photopolymer material 400 that were not exposed to light remain intact and form the desired structure, such as waveguide 102 and optical lens 104.

In block 308, another aqueous solution, for example an organic solvent is used to rinse away the developer solution and the dissolved portions of photopolymer material layer 400.

Then in block 310, the remaining optical structure formed from the photopolymer material layer 400 and support substrate 402 are put through a drying process. In this process, the rinsing aqueous solution is dried off. The drying operation of block 310 can be performed in various manners such as with heat, spinning, and/or air blowing.

The support substrate 402 and photopolymer material layer 400 can be formed at a size and shape that fits within a photolithography system, such as one suitable for semiconductor manufacturing. In one embodiment, support substrate 402 and photopolymer material layer 400 can be formed upon a wafer, such as a semiconductor wafer, that can be placed within a photolithography system.

In some implementations of method 300, a top cladding layer can be applied on top of waveguide 102 and optical lens 104.

While this invention has been described in terms of several preferred embodiments, there are alteration, permutations, and equivalents, which fall within the scope of this invention. It should also be noted that there are many alternative ways of implementing the methods and apparatuses of the present invention. It is therefore intended that the following appended claims be interpreted as including all such alterations, permutations, and equivalents as fall within the true spirit and scope of the present invention.

I claim:

1. An apparatus, comprising:
   a bottom cladding layer;
   a photopolymer material formed on the bottom cladding layer, the photopolymer material being patterned to form a waveguide on the bottom cladding layer and having a first height with an integrated optical lens formed on the bottom cladding layer and having a second height, wherein the second height is greater than the first height;
   wherein the optical lens has a directionally collimating lens curve that has an outline that is substantially defined within at least a plane that is coplanar with the top surface of the bottom cladding layer, wherein the light rays transmitted from the waveguide are collimated such that substantially all of the light rays emitted through the directionally collimating lens curve are parallel to each other and travel in a single direction; and
   a top cladding layer formed on at least the waveguide.

2. The apparatus of claim 1, further comprising a substrate, the bottom cladding layer being formed on the substrate.

3. The apparatus of claim 1, wherein the optical lens has a thee-dimensionally contoured shape.

4. The apparatus of claim 1, wherein the optical lens has an inclined back surface that has a first edge that joins the waveguide and a second edge that extends to the second height of the optical lens.

5. The apparatus of claim 4, wherein the inclined back surface is substantially flat and is inclined at an angle.

6. The apparatus of claim 1, wherein the optical lens has a width that expands as the optical lens extends away from the waveguide.

7. An apparatus, comprising:
a bottom cladding layer;
a photopolymer material formed on the bottom cladding layer, the photopolymer material being patterned to form a waveguide on the bottom cladding layer and having a first height and being patterned to form an optical lens on the bottom cladding layer such that the lens is integrally and continuously formed with the waveguide such that the lens includes a second height that is greater than the first height; and
a top cladding layer formed on at least the waveguide.

8. The apparatus of claim 7, wherein the optical lens is a collimating lens.

9. The apparatus of claim 8, wherein the collimating lens has a curve that defines a front lens surface that extends from the bottom cladding layer to the second height of the optical lens.

10. The apparatus of claim 7, wherein the waveguide and optical lens formed on the bottom cladding layer are contiguously formed of a single photopolymer material arranged on the bottom cladding such light passing through the integrated waveguide and lens extends in an optical path substantially in the first direction.

11. The apparatus of claim 10 further including a top cladding layer formed on the waveguide.

12. The apparatus of claim 11 wherein the top cladding layer is further formed on a top surface of the lens structure.

13. The apparatus of claim 10, wherein the optical lens has an inclined top surface that is arranged at an angle to the bottom cladding layer.

14. The apparatus of claim 10, wherein the bottom cladding layer is formed on a substrate.

15. The apparatus of claim 10, wherein the apparatus is formed on a substrate that comprises the bottom cladding layer.

16. The apparatus of claim 10, wherein an optical face of the lens is configured such that light rays transmitted from the waveguide are collimated by the lens so that the light rays are emitted through the lens are projected in a plane that is substantially coplanar to the top surface of the bottom cladding layer.

17. The apparatus of claim 10, wherein the optical lens has a directionally collimating lens curve that has an outline that is substantially defined within at least a plane that is coplanar with the top surface of the bottom cladding layer, wherein the light rays transmitted from the waveguide are collimated such that substantially all of the light rays emitted though the directionally collimating lens curve are parallel to each other and travel in a single direction.

18. The apparatus of claim 10, wherein the bottom cladding material is planar in construction.

* * * * *